United States Patent [19]

Aida et al.

[11] Patent Number: 5,850,601
[45] Date of Patent: Dec. 15, 1998

[54] CORDLESS TELEPHONE APPARATUS

[75] Inventors: Kosaku Aida, Fujisawa; Yasuaki Takahara, Yokohama, both of Japan

[73] Assignee: Hitachi, Ltd., Tokyo, Japan

[21] Appl. No.: 604,838

[22] Filed: Feb. 22, 1996

[30] Foreign Application Priority Data

Feb. 28, 1995 [JP] Japan .................................. 7-040358

[51] Int. Cl.⁶ ................................................ H04Q 7/32
[52] U.S. Cl. ........................................ 455/426; 455/11.1
[58] Field of Search .................................... 455/426, 462, 455/421, 403, 550, 463, 11.1, 412; 379/67, 88, 89

[56] References Cited

U.S. PATENT DOCUMENTS

| | | | |
|---|---|---|---|
| 4,941,203 | 7/1990 | Patsiokas et al. | 455/517 |
| 5,127,042 | 6/1992 | Gillig et al. | 455/11.1 |
| 5,220,594 | 6/1993 | Ohnishi et al. | 455/412 |
| 5,325,420 | 6/1994 | Kikuchi | 455/463 |
| 5,442,680 | 8/1995 | Schellinger et al. | 455/426 |
| 5,488,649 | 1/1996 | Schellinger | 455/426 |
| 5,617,468 | 4/1997 | Nojima et al. | 455/421 |

*Primary Examiner*—Dwayne D. Bost
*Assistant Examiner*—Jean D. Aristilde
*Attorney, Agent, or Firm*—Antonelli, Terry, Stout & Kraus, LLP

[57] ABSTRACT

A cordless telephone apparatus has a base station connected to a public telephone network and assigned with a specific identification code and one or more personal stations linked to the base station through the medium of radio frequencies. The base station has one or more additional functions in addition to the speech function. The personal station can perform radio communications with the base station within a range in which radio waves from the base station is receivable and can perform radio communications with a cell station connected to a public telephone network outside the radio wave receivable range. The personal station has a remote-control instruction unit for instructing operation of the additional function of the base station. The personal station has a communication station decision unit for deciding which one of the base station and cell station can radio-communicate with the personal station, a storage unit for storing a specific identification code of the base station and a control code corresponding to the additional function, a DTMF signal generation unit for converting the given control code into a DTMF signal in accordance with a predetermined conversion rule, and a controller.

11 Claims, 8 Drawing Sheets

| ADDITIONAL FUNCTION | OPERATION BUTTON | CONTROL CODE | DTMF SIGNAL |
|---|---|---|---|
| SET | SET BUTTON | 01001·· | 0# |
| REPRODUCTION | REPRODUCTION BUTTON | ··· | 1# |
| REWIND | FUNCTION→7 | ··· | 7# |
| FORWARD | FUNCTION→9 | ··· | 9# |
| STOP | FUNCTION→8 | ··· | 8# |
| ⋮ | ⋮ | ⋮ | ⋮ |

FIG.10
| OPERATION | INDOORS | DTMF OPERATION |
|---|---|---|
| SET | SET BUTTON | 0# |
| REPRODUCTION | REPRODUCTION BUTTON | 1# |
| REWIND | FUNCTION→7 | 7# |
| FORWARD | FUNCTION→9 | 9# |
| STOP | FUNCTION→8 | 8# |
| ⋮ | ⋮ | ⋮ |
FIG.11
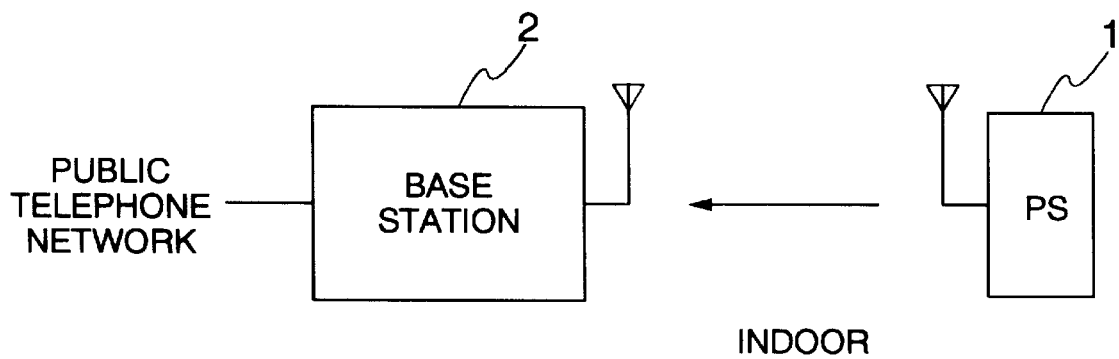
FIG.12
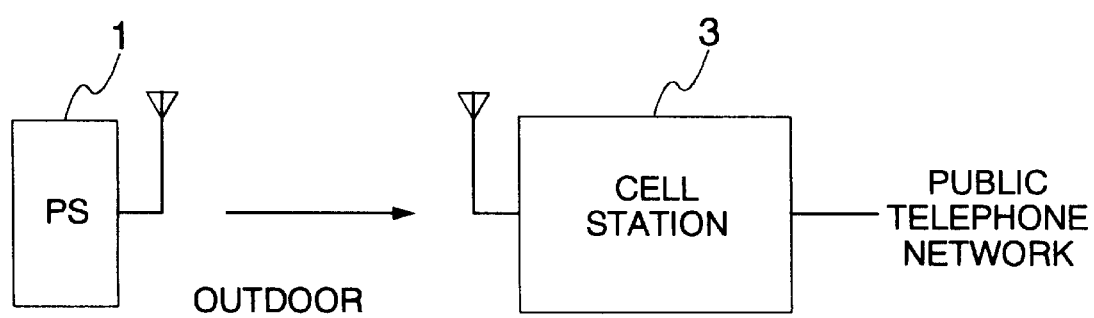

CORDLESS TELEPHONE APPARATUS

BACKGROUND OF THE INVENTION

The present invention relates to cordless telephone apparatus and more particularly to a personal handyphone system (PHS) which can be utilized as a personal station (PS) near an indoor base station or as a portable telephone at a place remote from the indoor base station.

For example, Japanese Patent Application Unexamined Publication No. JP-A-60-263550 describes a "remote control type automatic answering telephone apparatus" which can permit a user being out to remotely control the setting of an automatic answering telephone installed in his (or her) home or his (or her) office and the reproduction, rewind or advance of recorded contents by using a telephone capable of generating a dual-tone multifrequency (DTMF) signal, such as a public telephone station. In the automatic answering telephone described in this public literature, a user of the automatic answering telephone inputs a DTMF signal representative of, for example, a personal code number which has precedently been set to prevent a third person from operating the automatic answering function and thereafter, operates the automatic answering function by inputting a DTMF signal representative of a combination of a numerical key and another key, thus remotely controlling the desired automatic answering function.

On the other hand, Japanese Patent Application Un-examined Publication No. JP-A-2-149164, for example, describes a "cordless telephone apparatus" in which the automatic answering function provided for an indoor base station is remotely controlled by a PS through the medium of radio frequencies. In the cordless telephone according to this prior art, a desired automatic answering function is remotely controlled by performing radio transmission of an identification (ID) code preset between a PS and an indoor base station and a control code for the automatic answering function from the PS to the indoor base station. In this case, the remote control can be carried out by using either a remote control button provided to the PS and dedicated to control of the automatic answering function or a numerical button or a combination of other keys provided to the PS. With the above techniques, operations such as the setting and reproduction of the automatic answering function can be effected from the PS of cordless telephone.

Correspondence between a remote control method for automatic answering function by the PS of cordless telephone and a remote control method for automatic answering function using the DTMF signal is shown in a correspondence table of FIG. 10. The automatic answering telephone can be set from an indoor cordless telephone by depressing a "set button" and from a public telephone station generating the DTMF signal by depressing first "0" and then "#". Similarly, an automatic answering function corresponding to reproduction of the automatic answering telephone can be effected by means of the indoor cordless telephone by depressing a "reproduction button" and by means of the public telephone station generating the DTMF signal by depressing "1" and "#" and an automatic answering function corresponding to rewinding can be effected by means of the indoor cordless telephone by depressing a "functional button" and "7" and by means of the public telephone station by depressing "7" and "#". When operating the automatic answering function from the public telephone station by using the DTMF signal, the automatic answering function can be rendered to be ready for operation by inputting a DTMF signal representative of a preset personal code number before performing the operation.

Incidentally, at present, services of the PHS are practiced which permits the indoor and outdoor use of the same PS by making possible communications between a PS of cordless telephone taken out and a cell station (CS) installed outdoors ("Digital Mobile Communication" by Moritugu Kuwahara, pp.327–329, Kagaku Shinbunsha).

The PHS is used in use forms as shown in FIGS. 11 and 12. When a PS 1 of cordless telephone is located in the vicinity of the base station 2 as shown in FIG. 11, the PS 1 is connected to the public telephone network through an indoor base station 2 which is radio-linked to the PS 1. On the other hand, when a PS 1 of cordless telephone is located at a place remote from the base station 2 shown in FIG. 12, the PS 1 is connected to the public telephone network through a CS 3 installed near the PS 1. In the case of the above use forms, two kinds of telephone numbers, i.e., a subscriber telephone number of the indoor base station and a public telephone number used for the outdoor PS, are applied to one set of cordless telephone and therefore, the PS taken out can call the indoor base station installed indoors through the CS and public telephone network.

When considering an instance where the above-described PHS is provided with the automatic answering function, the automatic answering function provided for the indoor base station can be utilized indoors from the PS in the PHS by performing remote control by using a button provided for the PS and dedicated to remote control. But when the automatic answering function provided for the indoor base station of PHS installed indoors is utilized outdoors, the control code, for example, cannot be transmitted from the PS directly to the indoor base station and hence remote control based on the DTMF signal must be performed through the public telephone network as in the case of the prior arts. More particularly, it is necessary for the PS taken out to call the indoor base station through the CS and public telephone network and then cause a DTMF signal generation unit in the PS to generate a DTMF signal similarly to the operation from an outdoor public telephone so as to remotely control the automatic answering function provided for the indoor base station, raising a problem that the user is required to remember, as shown in FIG. 10, different operational methods for the case where the automatic answering function is remotely controlled indoors and the case where the automatic answering function is remotely controlled outdoors.

SUMMARY OF THE INVENTION

Accordingly, the present invention contemplates elimination of the above problem and one object of the present invention is to provide a cordless telephone apparatus which can perform remote control of an additional function provided for an indoor base station by an operational method which is the same for indoor and outdoor remote control operations without requiring the user to remember different operational methods for indoor and outdoor remote control operations even when the additional function, for example, an automatic answering function is utilized by an outdoor PS of PHS.

A cordless telephone apparatus according to the present invention comprises an indoor base station connected to a public telephone network and assigned with a specific identification code, and one or more PS's radio-linked to the indoor base station. The indoor base station has one or more additional functions in addition to the communication function. The PS can perform radio communications with the indoor base station within a range in which radio waves from the indoor base station is receivable and can perform radio communications with a CS connected to the public telephone network outside the radio wave receivable range. The PS has a remote-control instruction unit for instructing the operation of an additional function of the indoor base station.

Further, the PS according to the present invention has a communication station decision unit for deciding which one of the indoor base station and the CS can radio-communicate with the PS, a storage unit for storing an identification code specific to the indoor base station and a control code corresponding to the additional function, a DTMF signal generation unit for converting the given control code into a DTMF signal in accordance with a predetermined conversion rule, and a controller.

When it is determined that radio communications between the indoor base station and the PS is possible, the controller reads a control code corresponding to an additional function instructed by the remote-control instruction unit and an identification code from the storage unit and transmits these codes to the indoor base station. When it is determined that radio communications between the CS and the PS is not possible, the controller controls the PS to cause it to transmit a DTMF signal representative of the converted control code.

According to the cordless telephone apparatus of the present invention, it is decided whether the opposite station directly communicating with the PS is the indoor base station or the CS. When it is determined that the opposite station is the indoor base station, the control code for instructing the operation of the remote control function is transmitted to the indoor base station. When it is determined that the opposite station is the CS, the control code is converted into a DTMF signal which in turn is transmitted to the CS. Since the above operation is carried out automatically, remote control of the additional function of the indoor base station can be effected by the user who simply applies the common instruction operation to the indoor base station directly or through the public telephone network.

When the communication station decision unit determined that the opposite station communicating with the PS is the CS, the controller of the PS calls the indoor base station through the public telephone network, whereby the calling operation required when calling the indoor base station from an outdoor PS of cordless telephone through the public telephone network can be made automatically. Then the cordless telephone of the present invention is more convenient for remote controlling than the conventional apparatus.

Further, the same personal code number is precedently stored in the storage unit of each of the indoor base station and PS. When the communication station decision units determined that the opposite station communicating with the PS is the CS, the controller in the PS transmits to the indoor base station a DTMF signal through the public telephone network. The DTMF signals are generated from the DTMF signal generation unit, and correspond to the personal code number. Accordingly, the operation for inputting a personal code number required for utilizing the additional function provided for the indoor base station can be automatically made from the outdoor PS of cordless telephone through the public telephone network. Then the cordless telephone of the present invention is more convenient for remote controlling than the conventional apparatus.

Further, the ID code stored in the storage unit in the PS can be rewritten. A plurality of kinds of DTMF conversion rules used for generating a DTMF signal by the DTMF signal generation unit in the PS can be provided. The DTMF conversion rule used for generating a DTMF signal by the DTMF signal generation unit in the PS can be changed. Through this, the additional function of an indoor base station of the type different from the type of the original indoor base station can be controlled remotely by the outdoor PS of cordless telephone through the public telephone network in accordance with the operational method which is the same as that for the original indoor base station.

Further, when the additional function provided for the indoor base station is an automatic answering function, the PS further comprises a speech data storage unit for storing a speech signal transmitted from the indoor base station upon remote control of the automatic answering function, whereby a speech signal once reproduced and transmitted upon remote control of the automatic answering function provided for the indoor base station and effected from the outdoor PS of cordless telephone can be stored in the speech data storage unit, thereby making it possible to decrease the number of communication operations when reproduction is carried out repeatedly.

BRIEF DESCRIPTION OF THE DRAWINGS

FIG. 10 is a comparison table between a remote control method for the automatic answering function by the PS of cordless telephone and a remote control method for the automatic answering function using a DTMF signal from a telephone other than the PS;

FIG. 11 is a diagram for explaining a use form of a PHS; and

FIG. 12 is a diagram for explaining another use form of the PHS.

DESCRIPTION OF THE PREFERRED EMBODIMENTS

Remote control of the additional function in a cordless telephone apparatus of the present invention will be described hereunder by way of example with reference to the accompanying drawings.

Figure 1:
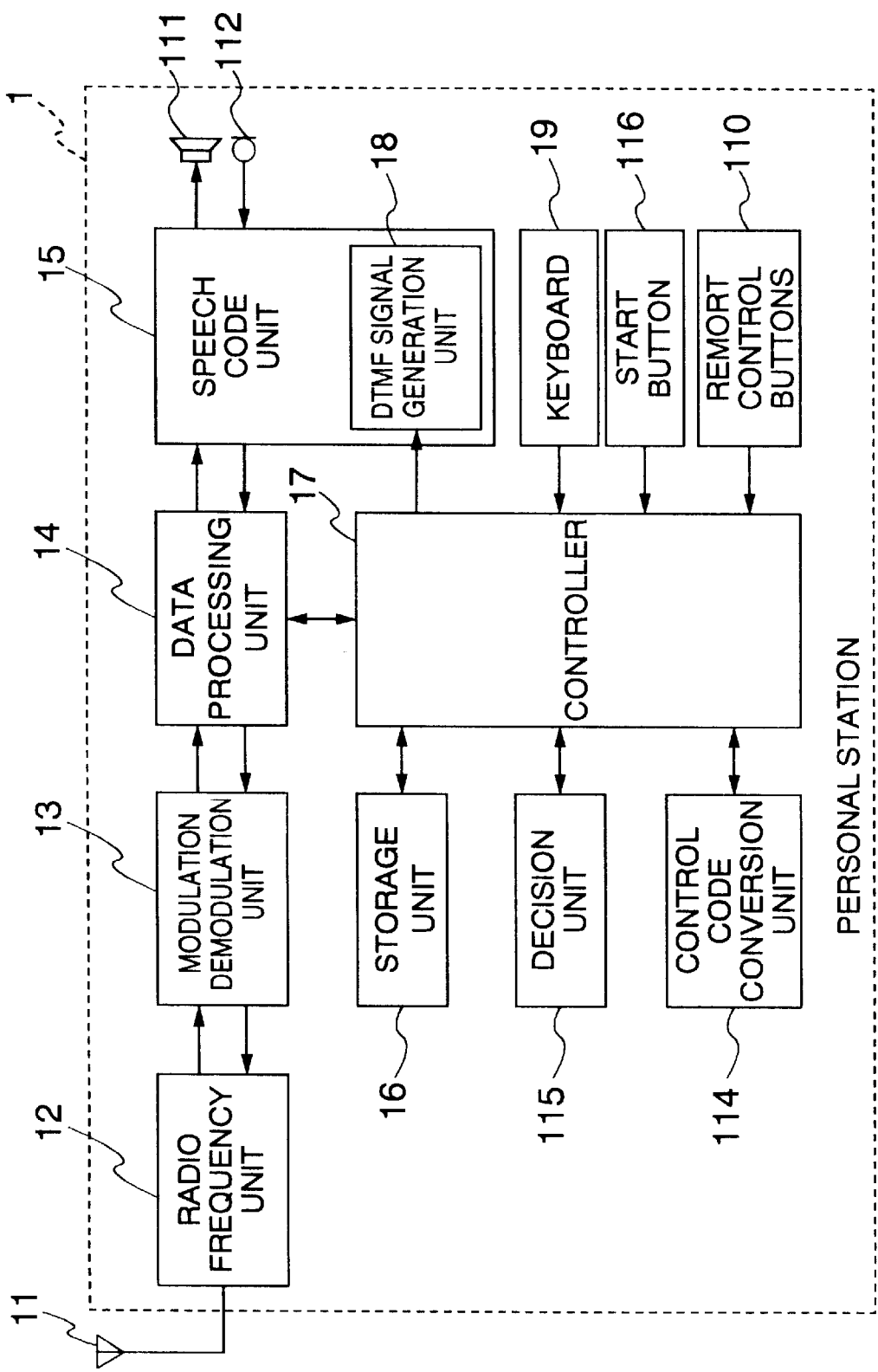
FIG. 1 is a block diagram showing the construction of an embodiment of a PS of cordless telephone apparatus according to the present invention.
Figure 2:
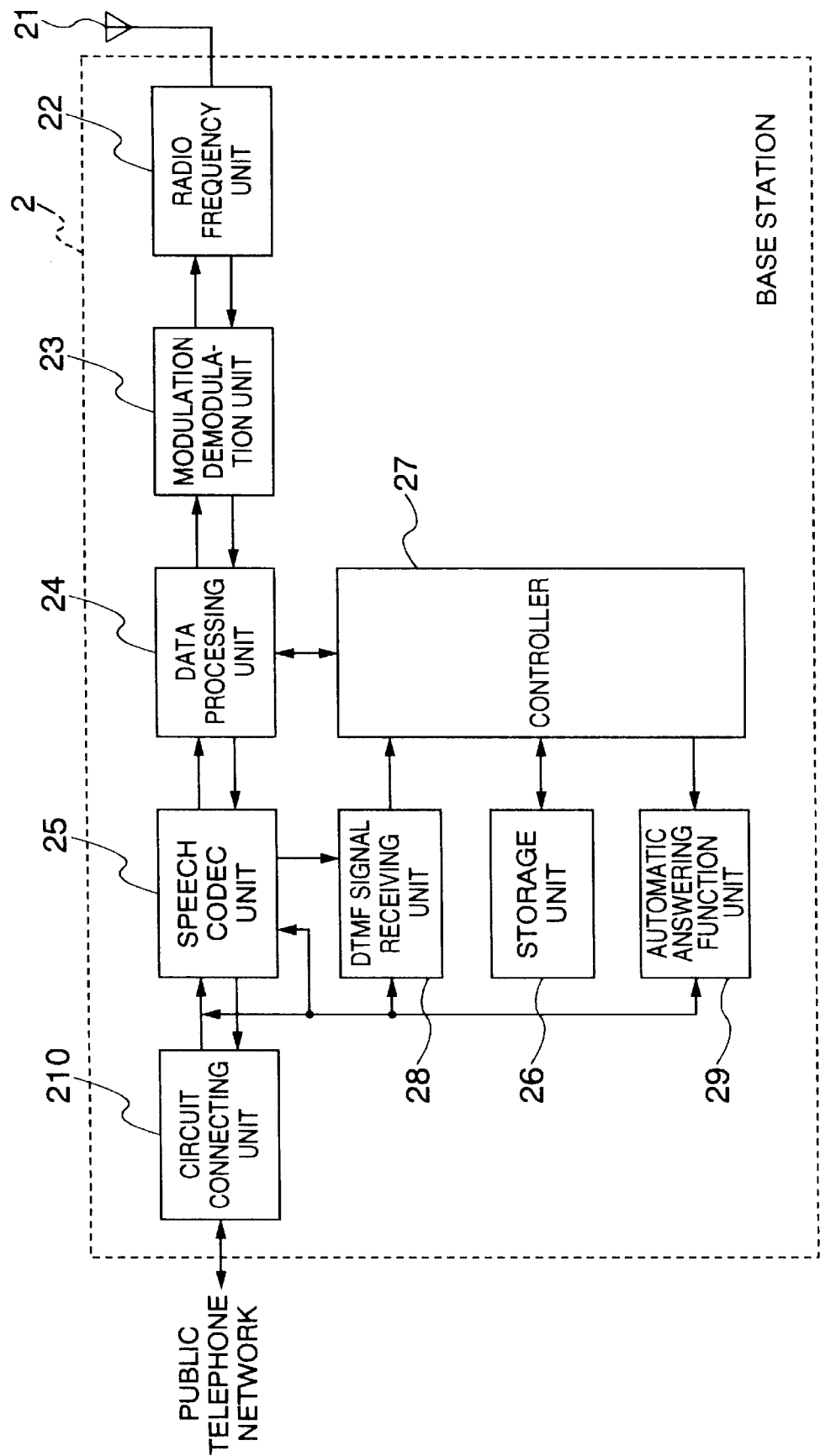
FIG. 2 is a block diagram showing the construction of an embodiment of an indoor base station of cordless telephone apparatus according to the present invention.

In an embodiment of the cordless telephone apparatus of the present invention, a PS (Personal Station) and an indoor base station have functional configurations as shown in FIGS. 1 and 2, respectively. In these Figures, reference numeral 1 designates the PS for use in the cordless telephone apparatus and 2 the indoor base station for use in the cordless telephone apparatus. The indoor base station 2 has an automatic answering function as one of the additional function. The PS 1 shown in FIG. 1 includes an antenna 11, a radio frequency unit 12, a modulation/demodulation unit 13, a data processing unit 14, a speech CODEC unit 15, a storage unit 16, a controller 17, a DTMF signal generation unit 18, a keyboard 19, remote control buttons 110, a loudspeaker 111, a microphone 112, a control code conversion unit 114, a decision unit 115, and a remote-control start button 116. The indoor base station 2 shown in FIG. 2 includes an antenna 21, a radio frequency unit 22, a modulation/demodulation unit 23, a data processing unit 24, a speech CODEC unit 25, a storage unit 26, a controller 27, a DTMF signal receiving unit 28, an automatic answering function unit 29, and a circuit connecting unit 210.

In describing embodiments hereinafter, PS 1 located "indoors" means that the PS 1 is within the receivable range of radio waves from an indoor base station 2, and does not always limit to the PS 1 be literally indoors. PS 1 located "outdoors" means that the PS 1 is outside the receivable range of radio waves from an indoor base station 2, and is within a range in which the PS 1 can communicate with a CS (Cell Station) 3. Accordingly, the term "outdoor" does not always limit itself to the outside of a building. Typically, the PS 1 is utilized as a handset of the indoor base station 2. The indoor base station 2 may also be provided with functional components belonging to the handset such as a loudspeaker and a microphone.

Next, general automatic response operation based on the automatic answering function will be described. In an instance where when a calling to an indoor base station 2 is originated externally through the public telephone network, any PS is placed in unready condition for reception or a call incoming operation is not carried out within a constant time because of the absence of a call incoming subscriber, the circuit is automatically connected by means of the circuit connecting unit 210 and thereafter, the automatic answering function unit 29 converts a response message from the call incoming subscriber to a calling subscriber (for example, "Hello, this is John Smith. I'm not in right now. At the sound of the tone, please leave your message.") into a speech signal through the speech CODEC unit 25 so as to automatically respond to the calling subscriber. Subsequently, in the presence of a message from the calling subscriber to the call incoming subscriber, the spoken message is converted, through the speech CODEC unit 25, into a digital signal which in turn is recorded as a call incoming message at the automatic answering function unit 29. The response message or the call incoming message may be recorded on either a semiconductor memory or a magnetic tape. In the case of recording on the magnetic tape, an analog speech signal as it is may be recorded without being passed through the speech CODEC unit 25.

A method of remotely controlling the automatic answering function unit 29 of an indoor base station 2 from a PS 1 will now be described. The PS 1 exchanges predetermined control signals with the indoor base station 2 or CS 3 in the vicinity of the PS 1 waiting for a telephone call, so as to be allowed to recognize, by means of the decision unit 115, which one of the indoor base station 2 and CS 3 is available to communicate with this PS 1 itself.

Figures 8, 9:
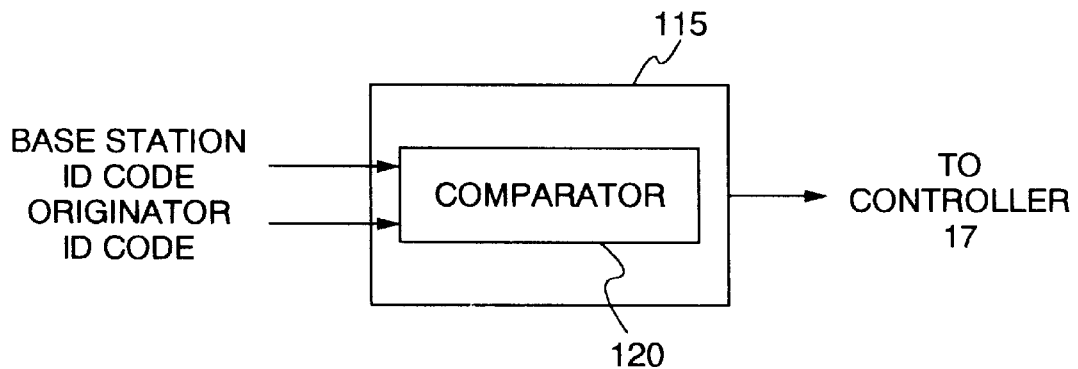
FIG. 8 is a block diagram showing an example of a decision unit of the PS.
FIG. 9 shows an example of a conversion rule table utilized by a control code conversion unit of the PS.

Decision operation of the decision unit 115 will be detailed herein with reference to FIG. 8. An intermittent control signal is constantly transmitted from each of the indoor base station 2 and the CS 3. Contained in the control signal is identification code information for specifying an originator of that control signal. The control signal from the indoor base station 2 contains a specific identification code assigned to the indoor base station 2, and the control signal from the CS 3 contains an identification code indicative of the CS 3. The PS 1 receives the control signal from the indoor base station 2 or the CS 3.

As shown in FIG. 8, the decision unit 115 of the PS 1 includes a comparator 120. An identification code of an indoor base station 2 to be linked with the PS 1, which identification code is stored in the storage unit 16, is supplied from the controller 17 to one input of the comparator 120. An originator identification code in the received control signal is supplied to the other input of the comparator 120 through the controller 17. The indoor base station identification code and the originator identification code are compared together. When the two codes coincide with each other, the PS 1 is possible to communicate with the indoor base station 2. In this case, the decision unit 115 applies a decision output notifying that the communication station is the indoor base station to the controller 17. When the two codes do not coincide with each other, the PS 1 is possible to communicate with the CS 3, the decision unit 115 applies a decision output notifying that the communication station is the CS 3 to the controller 17. The decision unit 115 according to the present invention is not limited to that of FIG. 8 but may be realized with a decision unit having an equivalent function.

Firstly, when the remote control start button 116 is depressed, the decision unit 115 decides whether the opposite communication station directly communicate with the PS 1 at the moment is the indoor base station 2 or the outdoor CS 3. When the indoor base station 2 is determined to be the communication station of the PS 1 and a user of PS 1 depresses a remote control button 110 corresponding to the operation of the automatic answering function unit 29, the controller 17 reads from the storage unit 16 a control code corresponding to the depressed button and an ID code corresponding to the indoor base station 2 which is to be controlled remotely and performs radio transmission of the control code and ID code to the indoor base station 2 through the data processing unit 14, modem unit 13, radio frequency circuit 12 and antenna 11.

Figure 3:
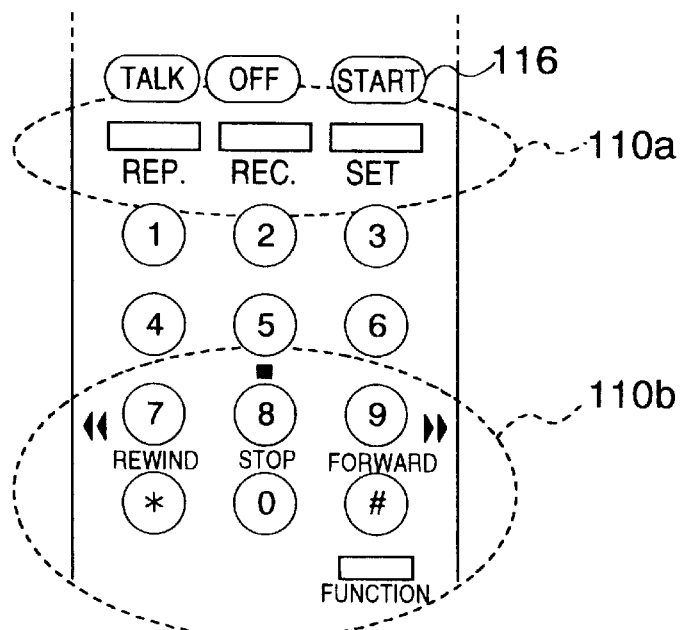
FIG. 3 illustrates a handset portion, showing an example of the arrangement of remote control buttons and a remote control start button in the PS of FIG. 1.

Shown in FIG. 3 is an example of the arrangement of remote control buttons and remote control start button in the PS 1 of FIG. 1. The remote control buttons 110 may be independent ones as shown at 110a in the PS 1 or may be ones as shown at 110b which are combined with a special button to indicate "rewind" when a "functional button" is depressed and then "7" is depressed, to indicate "stop" when the "functional button" is depressed and then "8" is depressed and to indicate "forward" when the "functional button" is depressed and then "9" is depressed. In FIG. 3, the remote control start button 116 is an independent button but similarly to the above, it may be realized with a combination of a plurality of buttons. In FIG. 3, the remote control start button 116 is a single button. However, the remote control start button may be formed of a combination of a plurality of buttons so as to avoid false operation.

A radio frequency signal transmitted from the PS 1 is received by the indoor base station 2 and fetched by the controller 27 through the antenna 21, radio frequency circuit 22, modem unit 23 and data processing unit 24. The controller 27 reads a procedure corresponding to the control code transmitted from the PS 1 from the storage unit 26 of the indoor base station 2 and operates the automatic answering function unit 29 in accordance with the procedure. For example, when the procedure of automatic answering function unit 29 corresponding to the control code from the PS 1 is "reproduction", a call incoming message recorded at the automatic answering function unit 29 is radio-transmitted to the PS 1 through the speech CODEC unit 25, data processing unit 24, modem unit 23, radio frequency circuit 22 and antenna 21. The PS 1 converts the call incoming message transmitted from the indoor base station 2 into a speech signal through the antenna 11, radio frequency circuit 12, modem unit 13, data processing unit 14 and speech CODEC unit 15, causing the loudspeaker 111 to reproduce the obtained call incoming message.

On the other hand, in an instance where when the remote control start button 116 is depressed, the decision unit 115 determines that the communication station of the PS 1 is an outdoor CS 3, operation is carried out as will be described below. In this case, the controller 17 calls an indoor base station 2 and sets up a line connection between the PS 1 and the indoor base station 2 through the CS 3 and public telephone network. Subsequently, when a remote control button 110 corresponding to a procedure to be executed by the automatic answering function unit 29 is depressed by a user of the PS 1, the controller 17 reads a control code of digital signal corresponding to the depressed button from the storage unit 16. The read-out control code is converted into a corresponding DTMF signal string by means of the control code conversion unit 114 and a DTMF signal of analog signal based on the thus obtained DTMF signal string is generated from the DTMF signal generation unit 18.

For the conversion of control code into DTMF signal string by the control code conversion unit 114, one-to-one correspondence between the button for remote control of the automatic answering function unit 29 and the DTMF signal string is set up in the form of a correspondence table as shown in FIG. 9. This table is precedently stored in the storage unit 16. By consulting this table, the control code is converted into the DTMF signal string for DTMF operation. For example, when a "set button" of the remote control buttons is depressed, the control code is converted into a DTMF signal "0#". Incidentally, the rule for conversion to DTMF signal string may be determined fixedly in advance but otherwise, a plurality of kinds of DTMF signal strings may be prepared to meet remote control of different types of indoor base stations. In this case, the PS 1 has its own ID code which is rewritable to ID codes for identifying different kinds of indoor base stations. Alternatively, setting of the conversion rule in the control code conversion unit 114 may be made to be freely changeable.

The DTMF signal generated from the DTMF signal generation unit 18 is coded by means of the speech CODEC unit 15 and transmitted to the CS 3 through the data processing unit 14, modem unit 13, radio frequency circuit 12 and antenna 11. Upon remote control of the automatic answering function unit 29 of the indoor base station 2, by reading a personal code number preset by the user from the storage unit 16 so as to permit a DTMF signal corresponding to the personal code number to be transmitted immediately after a circuit connection to the indoor base station 2 is established, operation of inputting the personal code number to start remote control can be automatically made.

The DTMF signal received by the CS 3 is received by the indoor base station 2 through the public telephone network and inputted to the DTMF signal receiving unit 28 through the circuit connecting nit 210. The thus inputted DTMF signal is converted into the original control code by means of the DTMF signal receiving unit 28, and the control code is fed to the controller 27. The controller 27 reads, from the storage unit 26 of indoor base station 2, an operation procedure corresponding to the control code transmitted from the PS 1 and operates the automatic answering function unit 29 in accordance with the procedure. For example, in a case that the procedure of automatic answering function unit 29 corresponding to the control code from the PS 1 is "reproduction", a call incoming message recorded at the automatic answering function unit 29 is reproduced into a speech signal through the speech CODEC unit 25, then the speech signal is sent to the public telephone network through the circuit connecting unit 210 and finally received by the PS 1 through the CS 3. Reproduction of the call incoming message at the PS 1 is effected similarly to reproduction of a call incoming message radio-transmitted directly from the indoor base station 2. In an instance where a call incoming message in the form of an analog signal is recorded directly on a magnetic tape, the message is sent directly to the public telephone network without being passed through the speech CODEC unit 25.

Figure 4:
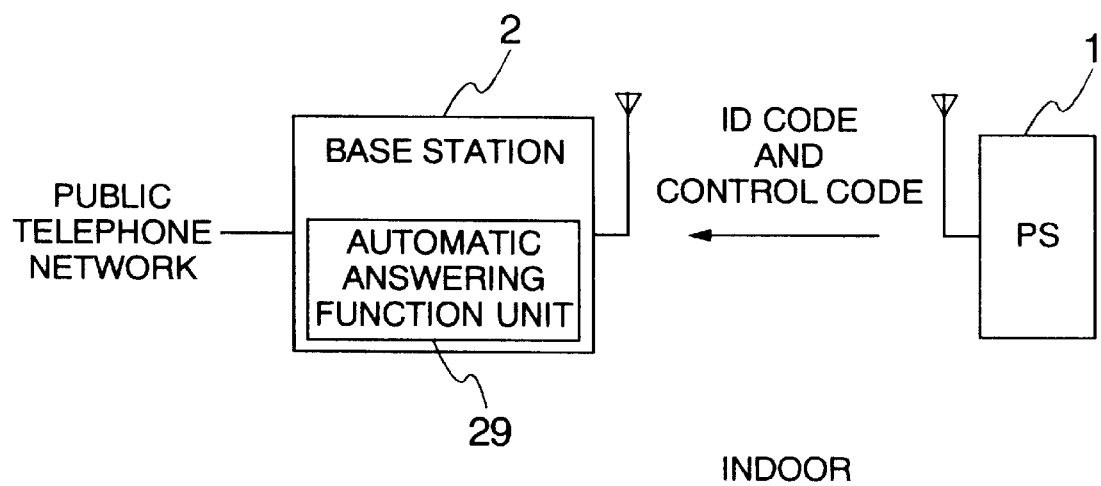
FIG. 4 is a diagram for explaining remote control of the indoor base station effected directly from the PS of cordless telephone of the present invention.
Figure 5:
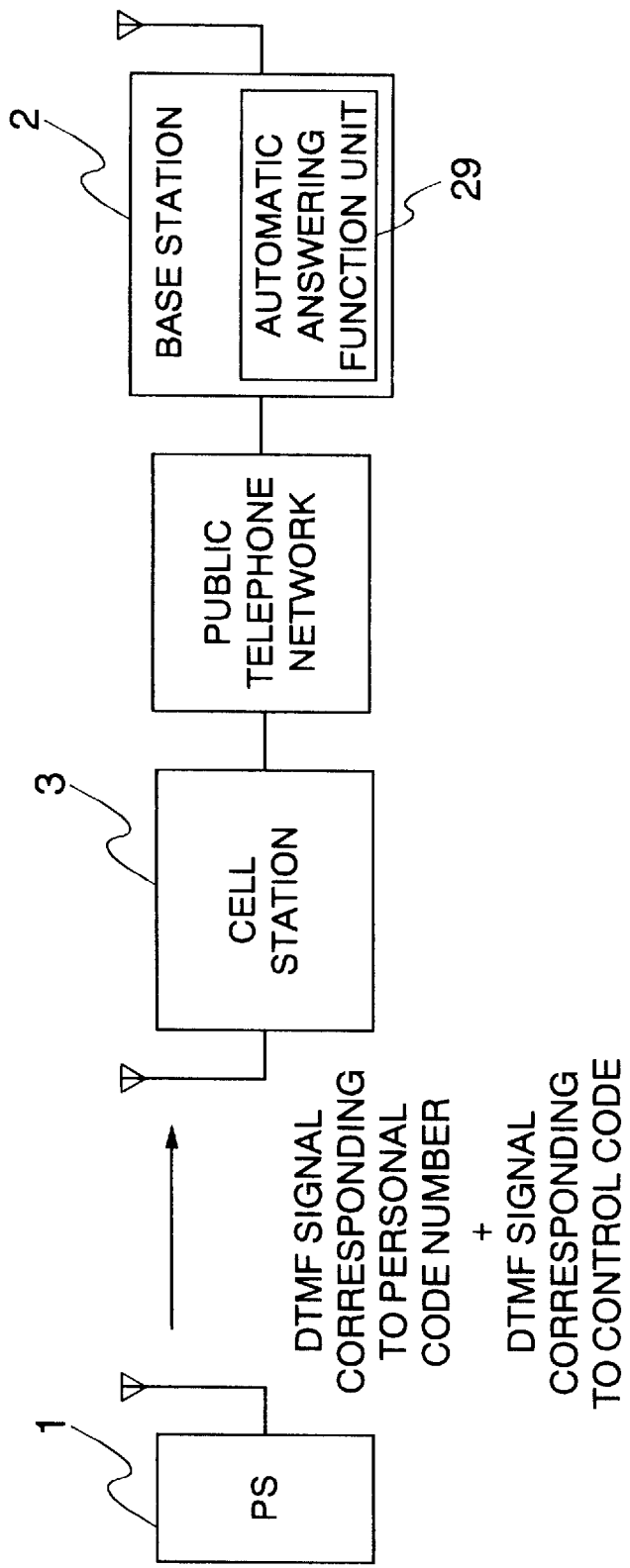
FIG. 5 is a diagram for explaining remote control of an automatic answering function of the indoor base station effected by the PS of cordless telephone of the present invention through the CS.

The cordless telephone apparatus of the present invention is used in forms as shown in FIGS. 4 and 5. A general description will be given of the aforementioned remote control of the automatic answering function unit with reference to FIGS. 4 and 5. Firstly, when the remote control start button 116 in the PS 1 is depressed, the decision unit 115 decides whether this PS 1 is located in the indoor or outdoor. As a result, in a case that the PS 1 is in the indoor, remote control of the automatic answering function unit 29 of the indoor base station 2 is effected from the PS 1 by means of the remote control button 110 by performing radio transmission of an ID code and a control code for remote control of the automatic answering function unit 29 from the PS 1 directly to the indoor base station 2. On the other hand, in a case that the PS 1 is in the outdoor, remote control of the automatic answering function unit 29 of the indoor base station 2 is effected from the PS 1 by means of the remote control button 110 by causing the PS 1 to set up a circuit connection to the indoor base station 2 through the CS 3 and public telephone network and transmit a DTMF signal corresponding to a personal code number or a DTMF signal corresponding to the control code. The controller 17, decision unit 115 and control code conversion unit 114 can be realized with a microcomputer.

Figure 6:
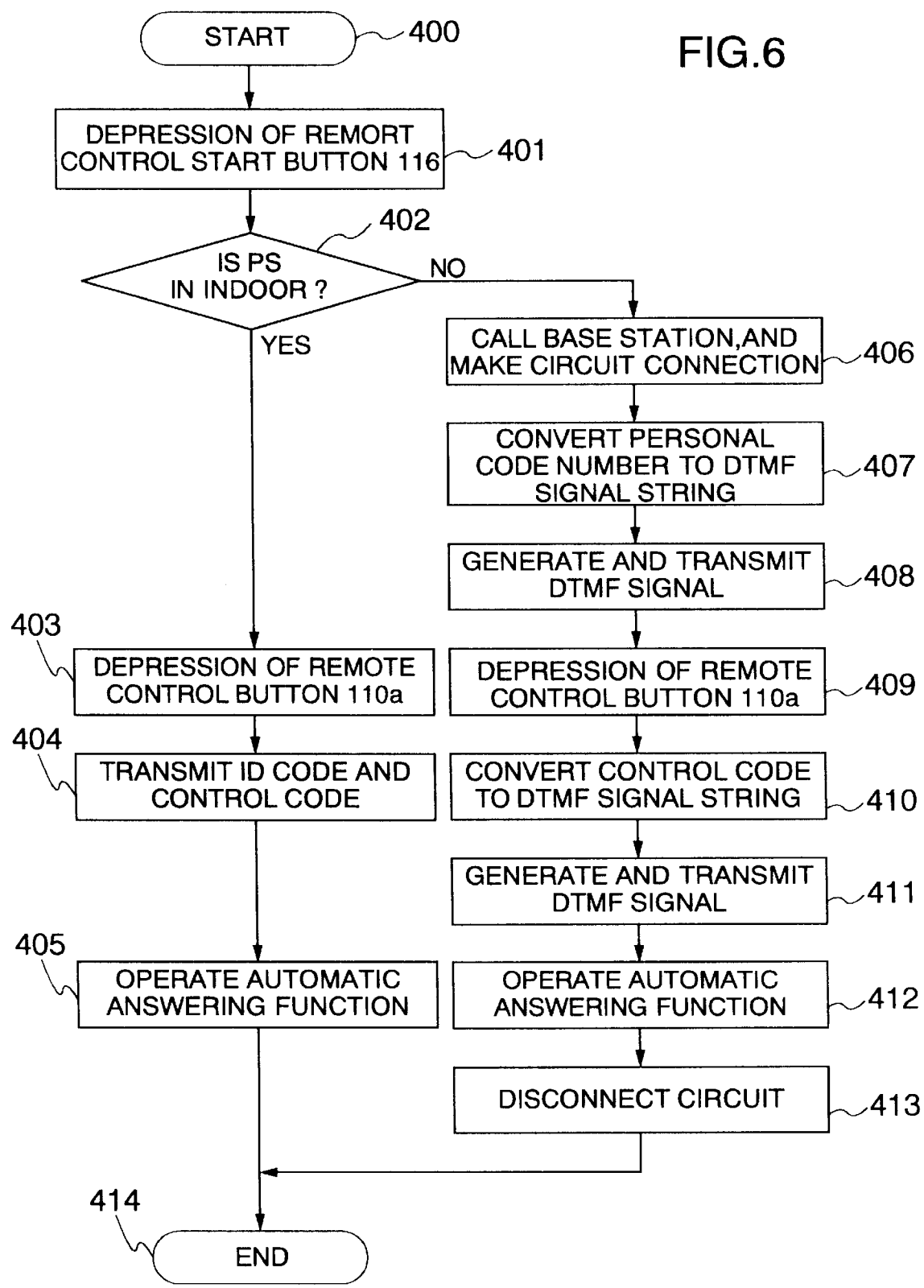
FIG. 6 is an operational flow chart of remote control of the automatic answering function of the indoor base station effected by the cordless telephone apparatus of the present invention.

FIG. 6 is a flow chart showing the operational procedure of the remote control of the automatic answering function carried out in the cordless telephone apparatus of the present invention. The operational procedure to be taken in accordance with the aforementioned remote control of the automatic answering function unit will now be described with reference to the flow chart of FIG. 6. In FIG. 6, a user of the PS 1, who is unconscious whether this PS 1 is in indoor or outdoor, first depresses the remote control start button 116 (step 401). Subsequently, the decision unit 115 of the PS 1 determines whether this PS 1 is in indoor or outdoor by deciding whether the communication station at present is the indoor base station 2 or CS 3 (step 402). When a result of decision in step 402 shows that the PS 1 in question is in indoor, the program proceeds to step 403. In step 403, the user of the PS 1 depresses a desired remote control button 110. The controller 17 reads, from the storage unit 16, a control code corresponding to the depressed remote control button 110 and an ID code corresponding to the indoor base station 2 and transmits these codes to the indoor base station 2 (step 404). The automatic answering function unit 29 of the indoor base station 2 is then operated (step 405). If two or more operations of remote control are designated by the remote control button 110, operations in steps 403 to 405 are repeated.

On the other hand, when a result of decision in step 402 shows that the PS 1 in question is in outdoor, the controller 17 calls the indoor base station 2 through the CS 3 and public telephone network and sets up a circuit connection (step 406). In the case where a personal code number of remote control is set between the indoor base station 2 and PS 1, that personal code number is subsequently read from the storage unit 16 so as to be converted into a DTMF signal string by means of the control code conversion unit 114 (step 407) and a corresponding DTMF signal is generated by the DTMF signal generation unit 18 and delivered (step 408). In step 409, the user of the PS 1 depresses a desired remote control button 110. The controller 17 reads a control code corresponding to the depressed remote control button 110 from the table (FIG. 9) of the storage unit 16 and the read-out control code is converted into a DTMF signal string by means of the control code conversion unit 114 (step 410). The DTMF signal generation unit 18 generates a corresponding DTMF signal on the basis of the DTMF signal string obtained in step 410 and delivers the generated DTMF signal (step 411). generation unit 18 and delivered (step 411). The automatic answering function unit 29 of the indoor base station 2 is then operated (step 412). When two or more operations are designated by the remote control button 110, operations in steps 409 to 412 are repeated. After the remote control ends, the circuit is disconnected in step 413 and the program ends (step 414).

As described above, according to the present embodiment, when the automatic answering function unit 29 of the indoor base station 2 is utilized by the PS 1, the automatic answering function unit 29 can be controlled remotely by operating the remote control button 110 provided in the PS 1 in the same way for the case where the PS is in indoor and the case where the PS 1 is in outdoor. Further, like the conventional apparatus, the automatic answering function unit 29 can be controlled remotely by using an outdoor telephone capable of generating a DTMF signal such as a public telephone station. In the foregoing description, when the communication station of the PS 1 is the CS 3, the controller 17 automatically performs the operation of calling the indoor base station 2 through the public telephone network. However, the user of the PS 1 may also carry out the calling operation after confirming a result of decision by the decision unit 115.

Figure 7:
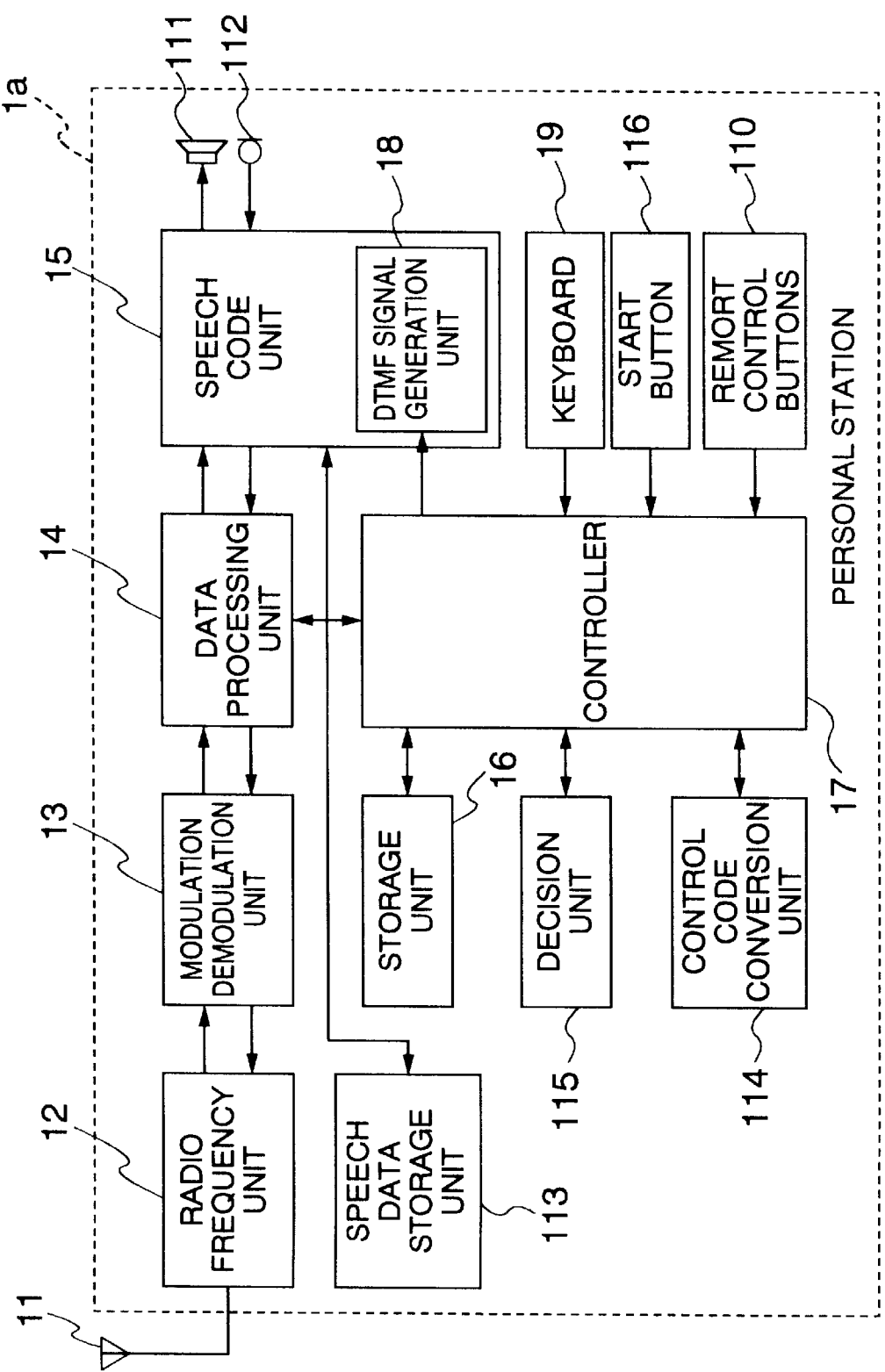
FIG. 7 is a block diagram showing the construction of another embodiment of the PS of cordless telephone apparatus according to the present invention.

Referring to FIG. 7, there is illustrated, in block diagram form, a functional configuration of a PS in another embodiment of the cordless telephone apparatus of the present invention. PS 1a of FIG. 7 is constructed by adding to the PS 1 of FIG. 1 described in the previous embodiment a speech data storage unit 113 connected to the speech CODEC unit 15, and components like those of FIG. 1 are designated by like reference numerals. The present embodiment operates in the same way as the previous embodiment with the exception that when a call incoming message recorded at the automatic answering function unit 29 of the indoor base station 29 is reproduced by the PS 1, the call incoming message transmitted from the indoor base station 2 is stored in the speech data storage unit 113 provided in the PS 1. Accordingly, even when a call incoming message is desired to be reproduced repeatedly, this call incoming message need not be transmitted repeatedly from the indoor base station 2 and consequently, the number of communication operations between the PS 1 and the indoor base station 2 or CS 3 can be decreased to reduce power consumption. The speech data storage unit 113 is preferably formed of a semiconductor memory but it may also be formed of another small-size speech signal recording unit.

In the foregoing embodiments, the additional function provided for the indoor base station 2 and remotely controlled by the PS 1 has been described as being only the automatic answering function but a different additional function such as for example speech monitoring in a room in which the indoor base station 2 is installed may be an object to be remotely controlled and similar effects can be obtained.

As described previously in detail, according to the cordless telephone apparatus of the present invention, even when the additional function provided for the indoor base station is utilized by an outdoor PS of cordless telephone, the user is not required to particularly learn the method for outdoor operation different from that for indoor operation and advantageously, the additional function can be controlled remotely by the operation method which is the same for indoor utilization and outdoor utilization.

Further, since the controller of the PS is so constructed as to call the indoor base station through the public telephone network when the communication station of the PS in question is determined to be the CS by means of the communication station decision unit, calling operation needed when an outdoor PS of cordless telephone calls the indoor base station through the public telephone network can be automated, thereby bringing about the effect that convenience for user's utilization can be more improved than in the conventional apparatus.

Further, the same personal code number is stored in the storage units of the PS and indoor base station and the controller of the PS is so constructed as to transmit a DTMF signal, generated from the DTMF signal generation unit in correspondence to the personal code number, to the indoor base station through the public telephone network when the communication station of the PS in question is determined to be the CS by means of the communication station decision unit. Therefore, operation of inputting the personal code number needed when the additional function provided for the indoor base station is utilized by an outdoor PS of cordless telephone through the public telephone network can be automated, thereby bringing about the effect that convenience for user's utilization can be more improved than in the conventional apparatus.

Further, by making changeable the setting of the ID code stored in the storage unit of the PS, providing a plurality kinds of DTMF conversion rules used when a DTMF signal is generated by means of the DTMF signal generation unit of the PS or making changeable the setting of the DTMF conversion rule used when a DTMF signal is generated by means of the DTMF signal generation unit, the additional function of an indoor base station of the type different from the original indoor base station can be remotely controlled to advantage in accordance with the operational method which is the same as that for the original indoor base station.

Further, when the additional function provided for the indoor base station is the automatic answering function and each PS has a speech data storing unit for storing a speech signal transmitted from the indoor base station by remote control of the automatic answering function, a speech signal, which is once reproduced and transmitted by remotely controlling the automatic answering function provided for the indoor base station by means of the outdoor PS of cordless telephone, is stored in the speech data storage unit, thereby bringing out the effect that the number of communication operations can be decreased when reproduction is carried out repeatedly.

In addition to the automatic answering function, the additional function of the indoor base station may include control of turn-on and-off of domestic illumination apparatus and control of operation of electric appliances and air conditioners. These additional functions can be controlled remotely by means of the PS of the present invention.

The present invention is in no way limited to the embodiments set forth so far and various improvements and alternations made by those skilled in the art in accordance with the contents disclosed in the specification of the present application may fall within the framework of the present invention.

We claim:

1. A cordless telephone apparatus comprising a base station connected to a public telephone network and assigned with a specific identification code, said base station having one or more additional functions, and one or more personal stations linked to said base station and having remote-control instruction means for instructing the operation of an additional function of said base station, said personal station being capable of performing radio communications with said base station within a range in which radio waves from said base station is receivable and capable of performing radio communications with a cell station connected to said public telephone network outside said range of radio waves, said personal station including:

communication station decision means for deciding which one of said base station and cell station can perform radio communications with said personal station;

storage means for storing the specific identification code of said base station and a control code corresponding to said additional function;

DTMF signal generation means for converting the given control code into a DTMF signal in accordance with a predetermined conversion rule; and control means for controlling said personal station to cause it to read from said storage means the control code corresponding to the additional function instructed by said remote-control instruction means and said identification code and transmit these codes to said base station when radio communications between said base station and said personal station is performable and read from said storage means the control code corresponding to the additional function instructed by said remote-control instruction means, supply the read-out control code to said DTMF signal generation means and transmit a DTMF signal representative of the converted control code when radio communications between said cell station and said personal station is performable.

2. A cordless telephone apparatus according to claim 1, wherein said control means includes means for calling said base station through said public telephone network when said communication station decision means determines that radio communications is performable between said cell station and said personal station.

3. A cordless telephone apparatus according to claim 1, wherein said storage means of said personal station further stores the same personal code number as that stored in said base station, and when said communication station decision means determines that radio communications is performable between said cell station and said personal station, said DTMF signal generation means reads said personal code number from said storage means to convert it into a corresponding DTMF signal, said control means including means for transmitting said DTMF signal representative of said converted personal code to said base station through said public telephone network.

4. A cordless telephone apparatus according to claim 1, wherein said identification code is rewritable in said storage means.

5. A cordless telephone apparatus according to claim 1, wherein said DTMF signal generation means has a plurality of different conversion rules.

6. A cordless telephone apparatus according to claim 1, wherein said DTMF signal generation means has rewritable storage means for storing a conversion table showing control codes and DTMF signals corresponding thereto, and said conversion rule represented by said conversion table is changeable.

7. A cordless telephone apparatus according to claim 1, wherein said additional function includes an automatic answering function, and said base station has a record unit for recording communication messages.

8. A cordless telephone apparatus according to claim 7, wherein said additional function includes a function of reproducing a communication message recorded on said record unit of said base station and transmitting the reproduced communication message to said personal station, and said personal station further includes speech data storage means for recording the communication message transmitted by the operation of the additional function of reproducing and transmitting said communication message.

9. A cordless telephone apparatus according to claim 1, wherein said personal station includes means for receiving a control signal transmitted from said base station or said cell station and containing identification information indicating that the signal is from said base station or said cell station, and said communication station decision means compares said identification information in said received control signal with the identification code which is stored in said storage unit and which is specific to said base station so as to determine that radio communications is performable between said base station and said personal station when said identification information coincides with said specific identification code and determine that radio communications is performable between said cell station and said personal station when said identification information does not coincide with said specific identification code.

10. A cordless telephone apparatus according to claim 1, wherein said remote-control instruction means includes first instruction means for instructing start of remote control and second instruction means for specifying the kind of said additional function, said communication station decision means performs decision operation in response to instructions from said first instruction means, and when said communication station decision means determines that radio communications is performable between said cell station and said personal station, said personal station calls said base station through said public telephone network to cause said cell station to establish a telephone circuit between said personal station and said base station and reads a control code corresponding to said additional function from said storage means in response to the instructions from said second instruction means to convert the control code into a DTMF signal in accordance with said conversion rule and transmit the DTMF signal to said base station through said cell station.

11. A cordless telephone apparatus according to claim 10, wherein said base station includes means which responds to said control code radio-transmitted directly from said personal station or the control code transmitted through said public circuit and said DTMF signal representative of said converted control code to execute the additional function instructed by said control code.

* * * * *